(12) United States Patent
Suzuki

(10) Patent No.: US 7,341,770 B2
(45) Date of Patent: Mar. 11, 2008

(54) FIXING ROTATING BODY

(75) Inventor: Kotaro Suzuki, Tokyo (JP)

(73) Assignee: Synztec Co., Ltd., Tokyo (JP)

( * ) Notice: Subject to any disclaimer, the term of this patent is extended or adjusted under 35 U.S.C. 154(b) by 435 days.

(21) Appl. No.: 11/076,059

(22) Filed: Mar. 10, 2005

(65) Prior Publication Data

US 2005/0201784 A1    Sep. 15, 2005

(30) Foreign Application Priority Data

Mar. 11, 2004   (JP)   .............................. 2004-068649

(51) Int. Cl.
 B32B 1/08      (2006.01)
 B32B 27/18     (2006.01)
 B32B 27/34     (2006.01)
 G03G 15/20     (2006.01)

(52) U.S. Cl. ................... 428/36.91; 428/336; 428/422; 428/473.5; 428/474.4; 399/333

(58) Field of Classification Search ............. 428/36.91, 428/336, 422, 473.5, 474.4; 399/333
See application file for complete search history.

(56) References Cited

U.S. PATENT DOCUMENTS 5,998,034 A  *  12/1999  Marvil et al. ................ 428/422
2005/0267246 A1 *  12/2005  McKeen ..................... 524/450

* cited by examiner

*Primary Examiner*—Ramsey Zacharia
(74) *Attorney, Agent, or Firm*—Sughrue Mion, PLLC

(57) ABSTRACT

A fixing rotating body of the present invention comprises a substrate and a mixture with which a surface of the substrate is coated without any primer layer, the mixture mainly containing a fluororesin composed of 60 to 90% by weight of a perfluoroalkoxy resin (PFA) and 40 to 10% by weight of polytetrafluoroethylene (PTFE) (with the proviso that PFA+PTFE=100% by weight) and a binder, and is hard to cause the problem of thermal conductivity to a surface of the fluororesin layer and excellent in abrasion resistance and releasing ability.

14 Claims, 2 Drawing Sheets

[Fig. 1]
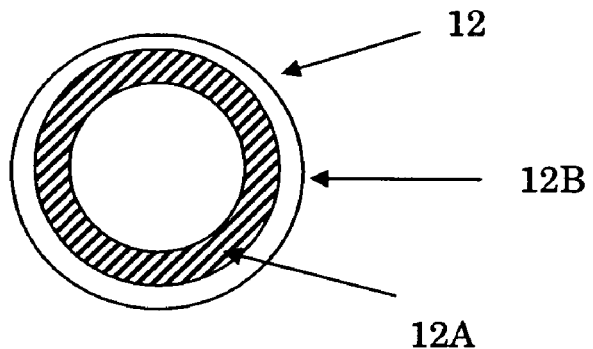
[Fig. 2]
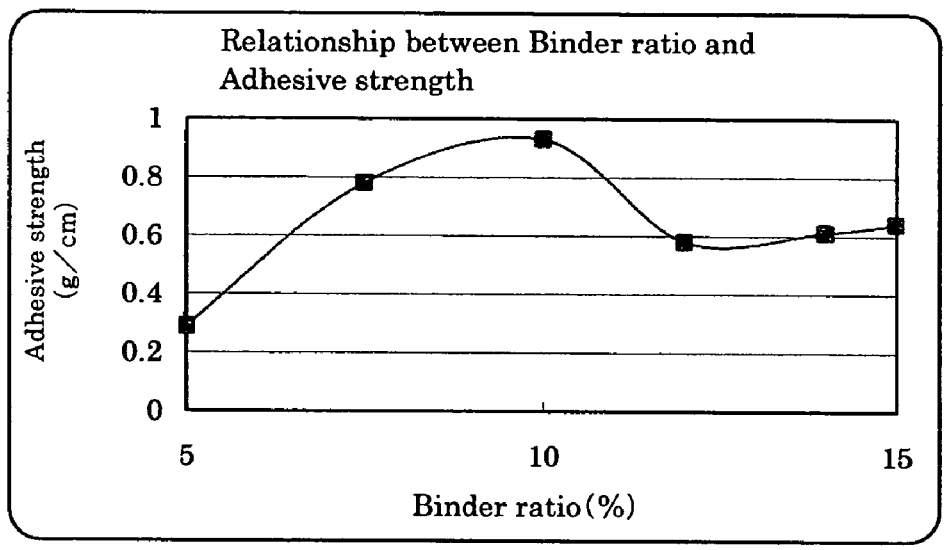
[Fig. 3]
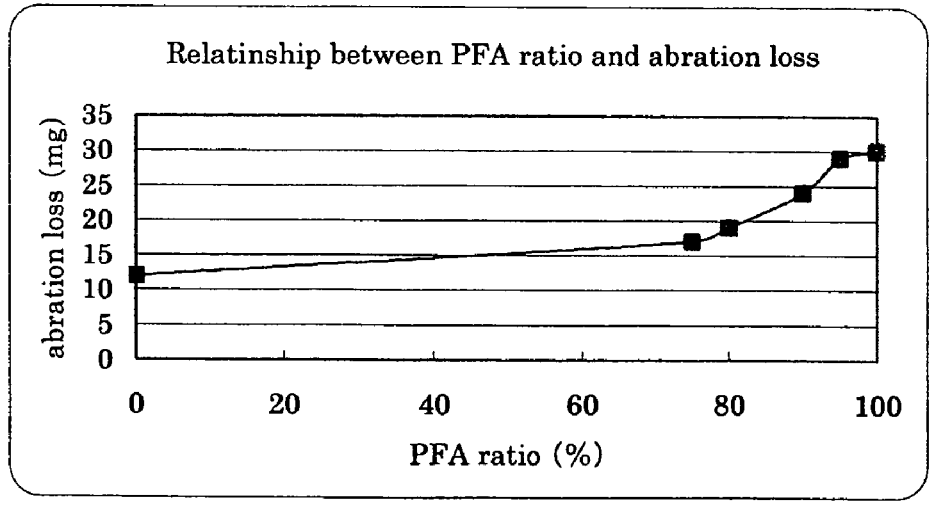

[Fig. 4]
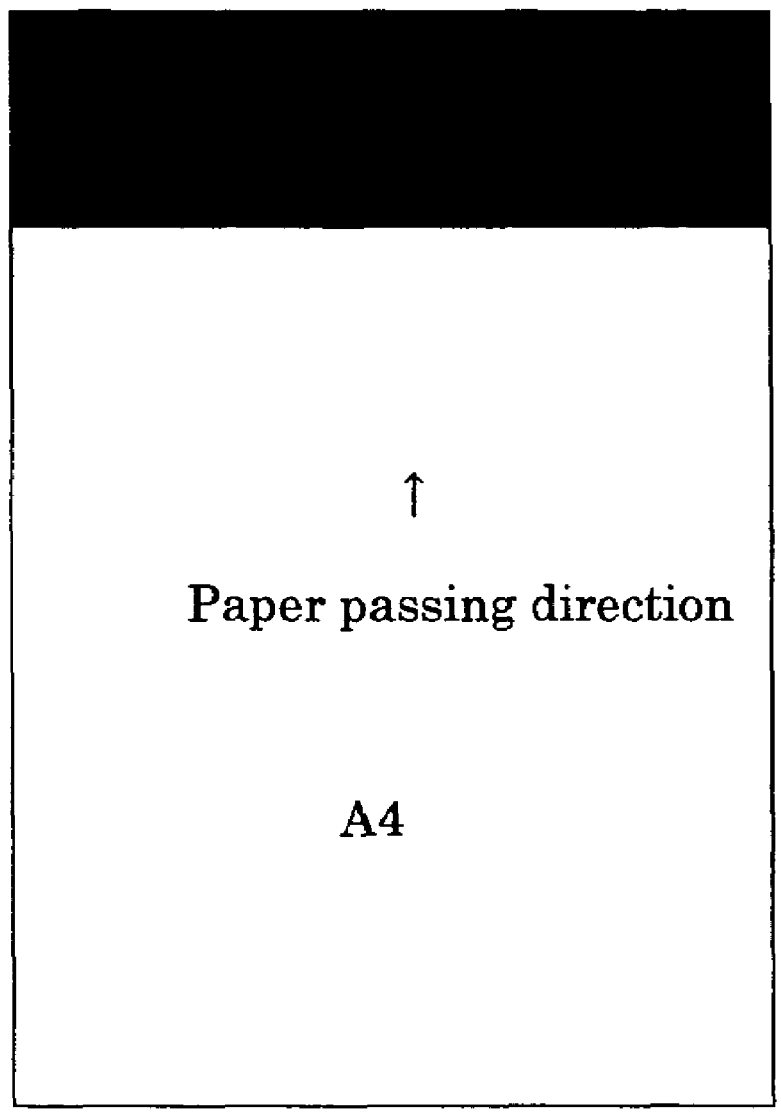

FIXING ROTATING BODY

BACKGROUND OF THE INVENTION

1. Field of the Invention

The present invention relates to a fixing rotating body such as a heating roller or an endless belt, which is coated with a fluororesin and can be used in a fixing apparatus for fixing unfixed toner images in copier, facsimile, laser beam printer and the like.

2. Description of the Related Art

In copier, laser beam printer and the like, unfixed toner images formed on a recording medium such as paper have hitherto been fixed by heat and pressure at a nip portion formed by a heating roller and a pressure roller in a fixing apparatus. Accordingly, a surface of the heating roller which directly contacts with a toner is coated with a fluororesin such as a perfluoroalkoxy resin (hereinafter briefly referred to as PFA) or polytetrafluoroethylene (hereinafter briefly referred to as PTFE), in order to prevent an offset caused by the toner from occurring.

However, the fluororesin is difficult to adhere to a metal used as a core of the heating roller, so that it is necessary to apply a primer. Accordingly, in the preparation of the heating roller, a primer layer is formed on a surface of the metal core as a layer which has a thickness of 5 to 10 μm, and further, a fluororesin layer is formed thereon as a coating layer which has a thickness of 20 to 30 μm. Thereafter, grinding is performed in order to control the surface roughness of the fluororesin layer. Accordingly, the total layer thickness of the heating roller becomes 20 to 30 μm.

Recently, from the energy-saving problem and the like, a halogen heater is energized only at the time of fixing to elevate the heating roller to a required fixing temperature, so that the heating roller excellent in thermal conductivity has become to be demanded. However, in the conventional heating roller, the core is coated with primer layer and the fluororesin layer poor in thermal conductivity to a total layer thickness of 20 to 30 μm. Accordingly, the heat of the halogen heater is not efficiently conducted to a surface of the heating roller, which causes the problem that the time taken until the heating roller reaches the surface temperature necessary for fixing the toner to the recording medium (hereinafter briefly referred to as the rising time) is slow. In order to solve this problem that the rising time of the heating roller is slow, a total layer thickness of the heating roller is 20 μm or less, preferably 17 μm or less, is considered to be necessary.

Consequently, in order to cope therewith, there has been used the method of grinding the fluororesin layer of the heating roller to a total layer thickness of 20 μm or less. However, the rising time is demanded to be further shortened, and it has become difficult to solve this problem only by decreasing the total layer thickness to 20 μm or less. On the other hand, there is a method which copes with this problem by decreasing the thickness of the metal core of the heating roller. However, when the heating roller using this thinned metal core is tried to be ground, the new problem that the metal core is deformed arises. It has therefore become very difficult to decrease the total layer thickness to 20 μm or less by grinding.

On the other hand, as a method for coating the core with the fluororesin whose total layer thickness is 20 μm or less without grinding, it has been proposed to solve this problem by dip coating using a coating containing an adhesive component (hereinafter briefly referred to as a "binder") and necessitating no primer (hereinafter briefly referred to as a "one-coat coating") (JP-A-11-194640). According to this method, there is obtained the heating roller having a fluororesin-mixed coating layer (hereinafter briefly referred to as a "coating layer") of 20 μm or less in the total layer thickness on the metal core decreased in thickness.

As the fluororesin used in such a one-coat coating, PTFE is used.

However, PTFE is good in abrasion resistance, but high in melt viscosity to cause insufficient fusion among resin particles, so that a number of pores of 1 to 3 μm in size occur in the coating layer. There is therefore the problem that the melted toner or paper particles enter these pores to generate roller contamination and an offset.

On the other hand, as the fluororesin used in the one-coat coating, PFA is also known. PFA is low in melt viscosity to cause sufficient fusion among the resin particles, so that the coating layer has a smooth surface and good releasing ability. However, PFA is poor in abrasion resistance, so that there is the problem that abrasion scratches occur by the contact with paper sheet edges or separating claws, resulting in an inferior image having the scratches transferred thereon.

Further, in the case of the one-coat coating, when improvement of adhesive strength between the coating layer and the metal core is intended by increasing the binder in the coating, releasing ability of the coating layer deteriorates. On the other hand, when improvement of releasing ability of the coating layer is intended by decreasing the binder in the coating, adhesive strength between the coating layer and the metal core deteriorates. There is therefore also the problem that it is difficult to keep a balance of ratio between the fluororesin and the binder.

Like this, the heating roller using the conventional one-coat coating can be decreased to 20 μm in thickness of the coating layer. However, when it is used in a machine, abrasion resistance or releasing ability thereof is inferior, so that it has been desired that both abrasion resistance and releasing ability are satisfied.

Further, in full-color copier and printer, the conventional roller fixing takes too much rising time until the roller reaches the fixing temperature. Accordingly, a belt type fixing apparatus using an endless fixing belt has recently been proposed as a fixing apparatus which can shorten this rising time. However, there are commands for further shortening of the rising time, increased paper passing speed and increased durability of the fixing belt. Further, a fluororesin layer on a surface of the fixing belt also has the same problems as with the heating roller, and resolution thereof has been desired.

BRIEF SUMMARY OF THE INVENTION

An object of the present invention is to provide a fixing rotating body having a fluororesin coating layer which is thin in the total layer thickness and excellent in thermal conductivity on a metal core or a substrate of a heating roller, or on a surface of an endless fixing belt substrate, and having excellent abrasion resistance and releasing ability.

The present invention relates to a fixing rotating body comprising a substrate and a mixture with which a surface of the substrate is coated without any primer layer, the mixture mainly containing a fluororesin composed of 60 to 90% by weight of PFA and 40 to 10% by weight of PTFE (with the proviso that PFA+PTFE=100% by weight) and a binder.

The above-mentioned fixing rotating bodies include a heating roller and an endless fixing belt.

Further, in the above-mentioned fixing rotating body, the above-mentioned binder is at least one selected from the group consisting of a polyamide, a polyamideimide and a polyimide, and the content thereof is preferably from 7 to 11% by weight based on 100% by weight of the above-mentioned mixture.

Furthermore, the thickness of the coating layer of the mixture of the fluororesin and the binder on the surface of the above-mentioned fixing rotating body is preferably from 5 to 20 μm.

In addition, the substrate is preferably coated with the mixture of the fluororesin and the binder by dip coating or spray coating.

The fixing rotating body of the present invention has the thin coating layer on the surface of the substrate thereof, so that it is good in thermal conductivity and excellent in energy-saving effect. Moreover, the compounding ratio of PFA and PTFE in the fluororesin contained in the coating layer is adjusted within a certain range, whereby the fixing rotating body has both good abrasion resistance caused by PTFE and good releasing ability caused by PFA. Accordingly, the fixing rotating body of the present invention can be used as the heating roller or the endless fixing belt, and is useful as a fixing apparatus for fixing unfixed toner images in copier, facsimile, laser beam printer and the like.

BRIEF DESCRIPTION OF THE DRAWINGS

FIG. 1 is a cross sectional view showing a fixing rotating body used for testing of mixing ratio of fluororesin and binder, wherein reference numeral 12 designates a roller, reference numeral 12A designates a core, and reference numeral 12B designates a fluororesin mixture coating layer;

FIG. 2 is a graph showing a relationship between binder ratio and adhesive strength;

FIG. 3 is a graph showing a relationship between the ratio of PFA in a fluororesin and abrasion loss; and FIG. 4 is a chart for measuring an offset temperature range used in a releasing ability comparison test.

DETAILED DESCRIPTION OF THE INVENTION

PFA used in the present invention is a copolymer of tetrafluoroethylene and perfluoroalkyl vinyl ether, and a dispersion obtained by emulsion polymerization and the like is preferably used.

As PFA, there can be used one which is commercially available as a coating. Examples thereof include Neoflon PFA (manufactured by Daikin Industries, Ltd.) and Teflon PFA (manufactured by Du Pont de Nemours & Co. and Du Pont-Mitsui Fluorochemicals Co., Ltd.).

On the other hand, in the present invention, as PTFE, a dispersion obtained by emulsion polymerization and the like is preferably used.

As PTFE, there can be used one which is commercially available as a coating. Specific examples thereof include Polyflon TFE (manufactured by Daikin Industries, Ltd.), Fluon (manufactured by ICI) and Teflon PTFE (manufactured by Du Pont de Nemours & Co. and Du Pont-Mitsui Fluorochemicals Co., Ltd.).

In the present invention, as for the ratios of PFA and PTFE in the fluororesin, PFA is from 60 to 90% by weight, and PTFE is from 40 to 10% by weight (with the proviso that PFA+PTFE=100% by weight).

These ratios are values in terms of solid content. When PFA is less than 60% by weight, releasing ability at high temperature is inferior. On the other hand, exceeding 90% by weight results in insufficient abrasion resistance.

In the present invention, resins used as the binders include a polyamide, a polyamideimide and a polyimide. These may be used either alone or as a combination of two or more thereof.

Such a binder is blended usually in an amount of 7 to 11% by weight based on 100% by weight (in terms of solid content) of the mixture mainly containing the fluororesin and the binder. Less than 7% by weight or exceeding 11% by weight results in insufficient adhesive force. The amount of the binder blended is preferably from 7.5 to 11% by weight, and more preferably from 7.5 to 10% by weight.

Further, as a measure against an electrostatic offset of the fixing rotating body, a conductive material such as carbon black can also be added to the above-mentioned mixture of the fluororesin and the binder as needed to use the resulting mixture as a conductive layer.

In the present invention, the coating layer is formed by using the one-coat coating, so that it is unnecessary to coat the substrate of the fixing rotating body with a primer. Accordingly, the thickness of the coating layer of the fixing rotating body can be decreased. The thickness of the coating layer is preferably from 5 to 20 μm, and more preferably from 8 to 17 μm. Less than 5 μm results in decreased reliability to abrasion resistance which is a matter of durability, whereas exceeding 20 μm results in the slow rising time, so that it is unfavorable.

The fixing rotating bodies of the present invention include the heating roller and the endless fixing belt.

As the core of the heating roller, there is used a hollow cylindrical pipe-like member made of aluminum or iron. The core having an outer diameter of 12 to 30 mm and a thickness of about 0.2 to 1 mm is used. Too thin a thickness results in insufficient strength as the heating roller, whereas too thick a thickness unfavorably results in large thermal capacity to take the long rising time.

Such a core is coated with the one-coat coating obtained by adding the binder and another component as needed to the above-mentioned fluororesin, and mixing them. The coating method may be any such as dip coating or spray coating.

The dip coating is a coating method of vertically immersing the core in the coating contained in a vessel and pulling up at a constant speed. Accordingly, when the specific gravity of the coating, the solution viscosity of the coating and the pulling-up speed of the core are constant, any number of rollers which are constant in thickness of the coating layer and in surface state can be produced. This is therefore a preferred method in roller processing.

In the dip coating, the pulling-up speed of the core is usually within the range of 0.5 to 10 mm/sec, but preferably from about 4 to 8 mm/sec. When the pulling-up speed is too fast, the coating can not be uniformly applied. It is therefore unfavorable to make the pulling-up speed faster than 10 mm/sec. On the other hand, when the pulling-up speed is too slow, mass productivity is lost. It is therefore unfavorable to make the pulling-up speed slower than 0.5 mm/sec.

The available viscosity range of the one-coat coating is from 50 to 300 cp, and most preferably from 100 to 200 cp. When the viscosity is higher than 300 cp, the coating layer becomes too thick. On the other hand, lower than 50 cp results in failure to obtain the required thickness of the coating layer.

The spray coating may be performed by a method of circumferentially rotating the core horizontally placed, and spraying the coating in mist form on the core while moving a spray gun in parallel with the core. In this case, the available viscosity range of the one-coat coating is from 50 to 300 cp, and most preferably from about 100 to 200 cp. When the viscosity is higher than 300 cp, the coating is insufficiently atomized to result in failure to perform uniform adhesion of the coating onto the core. On the other hand, lower than 50 cp results in failure to obtain the required thickness of the coating layer.

The unbaked coating layer thus formed is baked at a temperature of 350 to 400° C. The reason for this is that lower than 350° C. results in insufficient strength of the coating layer and insufficient adhesion to the core because the fluororesin is not sufficiently melted. On the other hand, exceeding 400° C. results in the initiation of thermal degradation of the fluororesin, so that it is unfavorable.

The heating roller thus obtained can be used without grinding a surface thereof, but can also be used with the surface ground depending on its purpose.

Further, in the case of the fixing belt, as a resin belt substrate, there can be used a resin excellent in heat resistance and strength, such as a polyimide resin, a polyamideimide resin, a polyamide resin or a polyethersulfone resin. As a metal belt substrate, there can be used an electrocasted nickel belt, a stainless steel belt and the like. Coating of the one-coat coating can be performed in the same manner as with the core described above.

The present invention will be illustrated with reference to the following examples, but the invention should not be construed as being limited thereto. All percentages and parts in the examples are on a weight basis, unless otherwise specified.

EXAMPLES

<Test of Mixing Ratio of Fluororesin and Binder>

As a test for determining the optimum mixing ratio of the fluororesin and the binder, fluororesin mixture-coated fixing rotating bodies (hereinafter briefly referred to as "rotating bodies") were each prepared using a one-coat coating changed in the mixing ratio thereof, and the adhesive strength of a fluororesin mixture coating layer of each rotating body was measured, thereby determining the optimum mixing ratio of the fluororesin and the binder. In this test, PFA (AW-5000 manufactured by Daikin Industries, Ltd.) was used as the fluororesin, and a polyamideimide (HI-400 manufactured by Hitachi Chemical Co., Ltd.) as the binder.

Hollow pipe-like cores made of aluminum (A5052) having an outer diameter of 20 mm and a thickness of 0.7 mm were prepared, and degreased, blasted and washed to adjust the surface roughness thereof to Rz 8 μm. Then, the above-mentioned PFA and polyamideimide were mixed at binder ratios as shown in Table 1 to prepare coatings, and the viscosity thereof was adjusted to 150 cp. The resulting coatings were each applied onto each core to a thickness of 15 μm by dip coating, and further applied thereon to a thickness of 35 μm by spray coating to give a total thickness of 50 μm. Then, baking was performed in an electric furnace at 400° C. for 30 minutes to prepare six kinds of rollers 12 indicated by Nos. 1 to 6. In order to test the adhesive strength for test of the binder ratios, the coating layers used herein are formed thicker than that of the fixing rotating body of the present invention. This is because the coating layer of 15 μm in thickness obtained by dip coating can not be peeled from the core, which makes it impossible to measure the adhesive strength.

As shown in FIG. 1, the roller 12 comprises the core 12A and the thick coating layer 12B for the adhesive strength test, which is directly applied onto the whole peripheral surface of the core 12A, in other words, without any primer layer.

A cut of 10 mm in width is circumferentially made in each of three places of the roller 12, and the coating layer is partly peeled. Then, the roller was attached to an autograph (S-100) manufactured by Shimadzu Corporation, and a peeling test was performed at a tensile speed of 50 mm/min to measure the adhesive strength (kgf/cm) of the coating layer. The results of this measurement are shown in Table 1 and FIG. 2. FIG. 2 is a graph showing a relationship between binder ratio and adhesive strength.

As a result of measurement, it was proved that the adhesive strength showed a high value at a binder ratio of 7 to 11% to improve adhesive properties.

The binder ratio in Table 1 was calculated by the following equation. The PFA amount in the binder ratio means the solid content of PFA.

Binder ratio (%)=[Binder amount/(binder amount+PFA amount)]×100

TABLE 1

| No. | Binder Ratio (%) | Adhesive Strength (g/cm) | Mean Value of Adhesive Strength (g/cm) | Note | Results of Evaluation |
|---|---|---|---|---|---|
| 1 | 5 | 0.25-0.33 | 0.29 | Coating Separation | Poor |
| 2 | 7.5 | 0.67-0.84 | 0.78 | Coating Breakage | Good |
| 3 | 10 | 0.85-0.98 | 0.93 | Coating Breakage | Good |
| 4 | 12 | 0.44-0.74 | 0.58 | Coating Separation | Poor |
| 5 | 14 | 0.45-0.68 | 0.61 | Coating Separation | Poor |
| 6 | 15 | 0.58-0.75 | 0.64 | Coating Separation | Poor |

<Evaluation of Abrasion Resistance>

One-coat coatings were prepared, fixing the binder ratio to 10% based on the fluororesin (in terms of solid content) and using the fluororesin in which the mixing ratio of PFA and PTFE was changed, and the abrasion resistance of each coating layer was tested. In this test, PFA (AW-5000 manufactured by Daikin Industries, Ltd.) and PTFE (EK-4800CR manufactured by Daikin Industries, Ltd.) were used as the fluororesin. Further, a polyamideimide (HI-400 manufactured by Hitachi Chemical Co., Ltd.) was used as the binder.

Aluminum (A5052) disks having a diameter of 120 mm and a thickness of 2 mm were prepared as test pieces for evaluation of abrasion resistance, and degreased, blasted and washed to adjust the surface roughness thereof to Rz 8 μm. Then, the one-coat coatings were each prepared in which the ratio of the polyamideimide was fixed to 10% and the mixing ratio of PFA and PTFE was changed as shown in Table 2, and whose viscosity was adjusted to 150 cp. The one-coat coatings were each applied onto the disk to a thickness of 15 μm by dip coating, and baking was performed in an electric furnace at 400° C. for 30 minutes to prepare six kinds of fluororesin coating test pieces indicated by Nos. 11 to 16.

For the resulting test pieces, a Tabor abrasion test (based on JIS K 7204) was performed under conditions shown below, and the abrasion loss was calculated from the weights before and after the abrasion test to evaluate abrasion resistance. The results thereof are shown in Table 2 and FIG. 3. In Table 2 and FIG. 3, the PFA ratio indicates the ratio of PFA contained in the fluororesin of the coating, and a relationship between the PFA ratio and the abrasion loss is shown.

Tabor Abrasion Test

Tabor tester; Rotary abrasion tester manufactured by Toyo Seiki Seisaku-sho Ltd.

Abrasion wheel; CS-10

Revolution speed; 60 rpm

Number of revolutions; 1,000

Load; 500 g

Table 2 and FIG. 3 show that when the amount of PFA contained in the fluororesin composed of PFA and PTFE is 90% or less (the amount of PTFE is more than 10%), the abrasion resistance is improved.

TABLE 2

| No. | PFA Ratio | Abrasion Loss (mg) | Mean Value of Abrasion Loss (mg) | Results of Evaluation |
|---|---|---|---|---|
| 11 | 0 | 8-17 | 12 | Good |
| 12 | 75 | 15-19 | 17 | Good |
| 13 | 80 | 17-21 | 19 | Good |
| 14 | 90 | 18-27 | 24 | Good |
| 15 | 95 | 28-32 | 29 | Poor |
| 16 | 100 | 28-33 | 30 | Poor |

<Comparison Test of Releasing Ability>

One-coat coatings were each prepared, fixing the binder ratio to 10% based on the fluororesin and using the fluororesin in which the mixing ratio of PFA and PTFE was changed, and each applied by dip coating and spray coating to prepare a fluororesin-coated heating roller (hereinafter briefly referred to as a roller). Then, using a machine, the surface temperature of the roller was set to each temperature, an image chart was taken by using an offset temperature range measuring chart, and it was confirmed whether an offset had occurred or not, thereby performing a comparison test of releasing ability by the difference in the mixing ratio of PFA and PTFE. In this test, PFA (AW-5000 manufactured by Daikin Industries, Ltd.) and PTFE (EK-4800CR manufactured by Daikin Industries, Ltd.) were used as the fluororesin. Further, a polyamideimide (HI-400 manufactured by Hitachi Chemical Co., Ltd.) was used as the binder.

Hollow pipe-like cores made of aluminum (A5052) having an outer diameter of 30 mm and a thickness of 0.7 mm were prepared, and degreased, blasted and washed to adjust the surface roughness thereof to Rz 8 µm. Then, the one-coat coatings were each prepared in which the ratio of the polyamideimide was fixed to 10% and the mixing ratio of PFA and PTFE was changed as shown in Table 3, and whose viscosity was adjusted to 150 cp. The resulting coatings were each applied onto each core by dip coating and spray coating. The dip coating was performed using a dip coater at a pulling-up speed of 8 mm/sec to a thickness of 15 µm. The spray coating was performed using a spray coater to a thickness of 15 µm. After the coating, baking was performed in an electric furnace at 400° C. for 30 minutes to prepare eight kinds of rollers in which the mixing ratio of PFA and PTFE and the coating method were changed. These rollers were each tested in a machine in releasing ability thereof by the difference in the mixing ratio of PFA and PTFE, as shown below, while controlling a roller surface to a test temperature. The results thereof are shown in Table 3. The PFA ratio in Table 3 indicates the ratio of PFA contained in the fluororesin, in terms of solid content.

Releasing Ability Evaluation Method

Releasing ability was tested by an offset temperature range measuring test.

Test Procedures

1. The roller is incorporated in a fixing device.
2. The fixing device is mounted on a main body of a machine.
3. A power source of a fixing heater is taken from the outside to make it possible to control the surface temperature of the roller.
4. Temperature control is performed while changing the roller surface temperature from 150° C. to 250° C. in steps of 5° C. An offset temperature range measuring chart shown in FIG. 4 is used as an original copy, and three sheets of paper are allowed to pass.
5. It is confirmed from image charts obtained by paper passing whether an offset has occurred or not, and confirmation of a temperature range in which the offset has occurred is made.

Criteria of Judgment:

The three image charts are taken using the offset temperature range measuring chart shown in FIG. 4, and it is visually confirmed whether the offset has occurred or not. When no offset is discovered, it is judged as "good". When an offset is discovered even on one of the three sheets, it is judged as the occurrence of an offset ("poor").

Tester:

Di250 (#1164) manufactured by Minolta Co., Ltd.

Roller specification; ϕ 30, A3 size

ET cartridge specification (for printer use)

Paper used; XEROX Paper 4200

Table 3 shows that when the amount of PFA in the fluororesin is from 60 to 100%, it has the effect on releasing ability. Further, it is also shown that sufficient releasing ability is obtained within the wide range of 150 to 240° C. which exceeds the ordinarily used temperature range, in both the dip coating and spray coating. In addition, it is shown that sufficient releasing ability is obtained in the dip coating even at a temperature 10° C. higher than in the spray coating.

TABLE 3

| Temperature | Dip Coating PFA Ratio (%) | | | | Spray Coating PFA Ratio (%) | | | |
|---|---|---|---|---|---|---|---|---|
| (° C.) | 50 | 60 | 90 | 100 | 50 | 60 | 90 | 100 |
| 150 | Good | Good | Good | Good | Good | Good | Good | Good |
| 155 | Good | Good | Good | Good | Good | Good | Good | Good |
| 160 | Good | Good | Good | Good | Good | Good | Good | Good |
| 165 | Good | Good | Good | Good | Good | Good | Good | Good |
| 170 | Good | Good | Good | Good | Good | Good | Good | Good |
| 175 | Good | Good | Good | Good | Good | Good | Good | Good |
| 180 | Good | Good | Good | Good | Good | Good | Good | Good |
| 185 | Good | Good | Good | Good | Good | Good | Good | Good |
| 190 | Good | Good | Good | Good | Good | Good | Good | Good |
| 195 | Good | Good | Good | Good | Good | Good | Good | Good |
| 200 | Good | Good | Good | Good | Good | Good | Good | Good |
| 205 | Good | Good | Good | Good | Good | Good | Good | Good |
| 210 | Good | Good | Good | Good | Good | Good | Good | Good |
| 215 | Good | Good | Good | Good | Good | Good | Good | Good |
| 220 | Good | Good | Good | Good | Good | Good | Good | Good |
| 225 | Good | Good | Good | Good | Good | Good | Good | Good |
| 230 | Good | Good | Good | Good | Good | Good | Good | Good |
| 235 | Good | Good | Good | Good | Good | Good | Good | Good |
| 240 | Good | Good | Good | Good | Good | Good | Good | Good |

TABLE 3-continued

| Temperature | Dip Coating PFA Ratio (%) | | | | Spray Coating PFA Ratio (%) | | | |
|---|---|---|---|---|---|---|---|---|
| (° C.) | 50 | 60 | 90 | 100 | 50 | 60 | 90 | 100 |
| 245 | Good | Good | Good | Good | Poor | Poor | Poor | Good |
| 250 | Poor | Good | Good | Good | Poor | Poor | Poor | Good |

The results described above reveals that the roller of the present invention in which the fluororesin is composed of 60 to 90% by weight of PFA and 40 to 10% by weight of PTFE (with the proviso that PFA+PTFE=100% by weight) is excellent in both abrasion resistance and releasing ability, regardless of the coating method, the dip coating or the spray coating.

What is claimed is:

1. A fixing rotating body comprising:
   a substrate; and
   a mixture with which a surface of the substrate is directly coated, said mixture mainly containing a fluororesin composed of 60 to 90% by weight of a perfluoroalkoxy resin (IPFA) and 40 to 10% by weight of polytetrafluoroethylene (PTFE) (with the proviso that PFA+PTFE=100% by weight) and a binder, wherein the content of the binder is from 7 to 11% by weight based on 100% by weight of the mixture.

2. The fixing rotating body according to claim 1, wherein said fixing rotating body is a heating roller.

3. The fixing rotating body according to claim 2, wherein said binder is at least one selected from the group consisting of a polyamide, a polyamideimide and a polyimide.

4. The fixing rotating body according to claim 3, wherein said substrate is coated with the mixture by spray coating.

5. The fixing rotating body according to claim 1, wherein said fixing rotating body is an endless fixing belt.

6. The fixing rotating body according to claim 5, wherein said binder is at least one selected from the group consisting of a polyamide, a polyamideimide and a polyimide.

7. The fixing rotating body according to claim 6, wherein said substrate is coated with the mixture by spray coating.

8. The fixing rotating body according to claim 1, wherein said binder is at least one selected from the group consisting of a polyamide, a polyamideimide and a polyimide.

9. The fixing rotating body according to claim 8, wherein said mixture is formed on the surface of said substrate as a coating layer which has a thickness of 5 to 20 μm.

10. The fixing rotating body according to claim 9, wherein said substrate is coated with the mixture by dip coating.

11. The fixing rotating body according to claim 1, wherein said mixture is formed on the surface of said substrate as a coating layer which has a thickness of 5 to 20 μm.

12. The fixing rotating body according to claim 11, wherein said substrate is coated with the mixture by dip coating.

13. The fixing rotating body according to claim 1, wherein said substrate is coated with the mixture by dip coating.

14. The fixing rotating body according to claim 1, wherein said substrate is coated with the mixture by spray coating.

* * * * *